United States Patent
Bosqui et al.

(12)
(10) Patent No.: US 6,195,598 B1
(45) Date of Patent: *Feb. 27, 2001

(54) POWER MARGIN INDICATOR FOR A ROTARY-WING AIRCRAFT, ESPECIALLY A HELICOPTER

(75) Inventors: Olivier Bosqui, Cabries; Raymond Jacques Gérard Berlioz, Salon-de-Provence, both of (FR)

(73) Assignee: Eurocopter, Marignane Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/977,610

(22) Filed: Nov. 25, 1997

(30) Foreign Application Priority Data

Nov. 26, 1996 (FR) .................................................. 96 14443

(51) Int. Cl.[7] .................................................. G01C 23/00
(52) U.S. Cl. ............................ 701/3; 340/963; 73/178 H
(58) Field of Search .................... 701/3, 14, 4; 73/178 H, 73/178 T; 340/963, 969, 971, 978

(56) References Cited

U.S. PATENT DOCUMENTS

| 4,034,605 | * | 7/1977 | Green ................................. 73/178 H |
| 4,736,331 | | 4/1988 | Lappos et al. ....................... 364/551 |
| 5,050,081 | | 9/1991 | Abbott et al. ................... 364/424.06 |
| 5,608,627 | | 3/1997 | Lecomte et al. .............. 364/424.012 |
| 5,886,649 | * | 3/1999 | Francois ................................. 701/14 |
| 5,908,485 | * | 6/1999 | Germanetti ......................... 73/178 H |

FOREIGN PATENT DOCUMENTS 2 710 026    3/1995  (FR) .

OTHER PUBLICATIONS

International (PCT) Published Patent Application No. WO96/26472.

* cited by examiner

*Primary Examiner*—Gary Chin
(74) *Attorney, Agent, or Firm*—Fisher, Christen & Sabol

(57) ABSTRACT

A power margin indicator for a rotary-wing aircraft, intended to give information on the power margin available on at least one engine and one gearbox of the aircraft. The indicator includes: (a) input unit (5) for the various control parameters of the engine and of the gearbox, (b) calculation device (6) connected to the input unit (5) which, on the basis of the parameters, formulate the power margin, expressed as a collective-pitch value, and (c) display units (4, 8, 9) showing, on a display screen (7), the power margins represented on a scale (8) which is graduated in collective-pitch equivalents, capable of moving past a pitch index (9) in a window (4) of the screen (7).

6 Claims, 3 Drawing Sheets

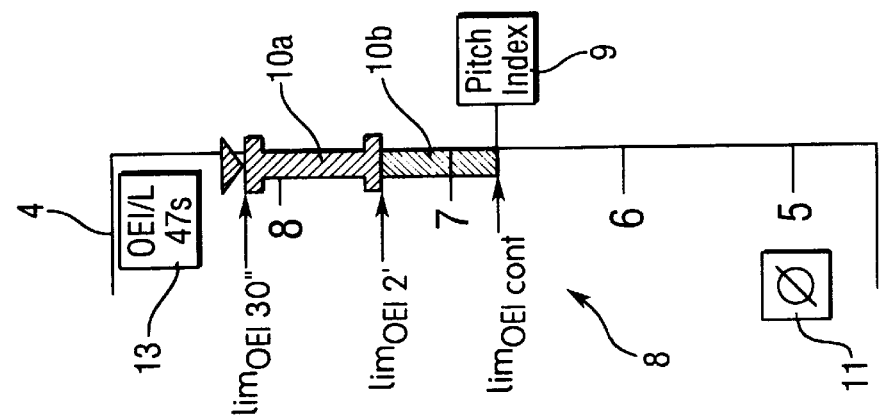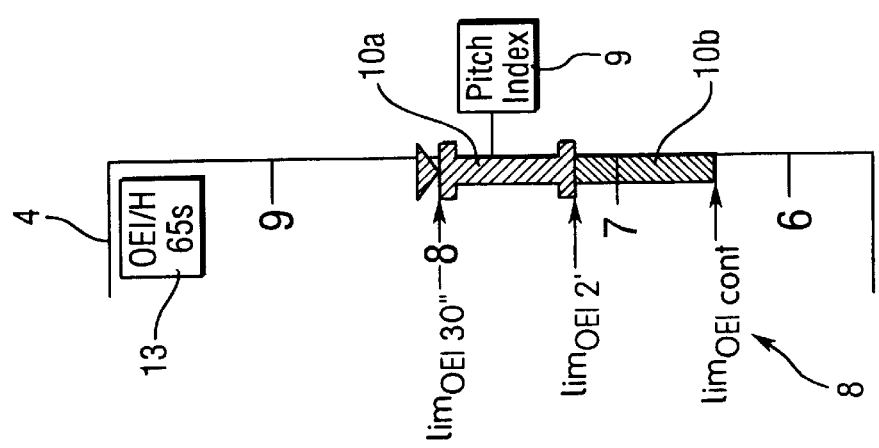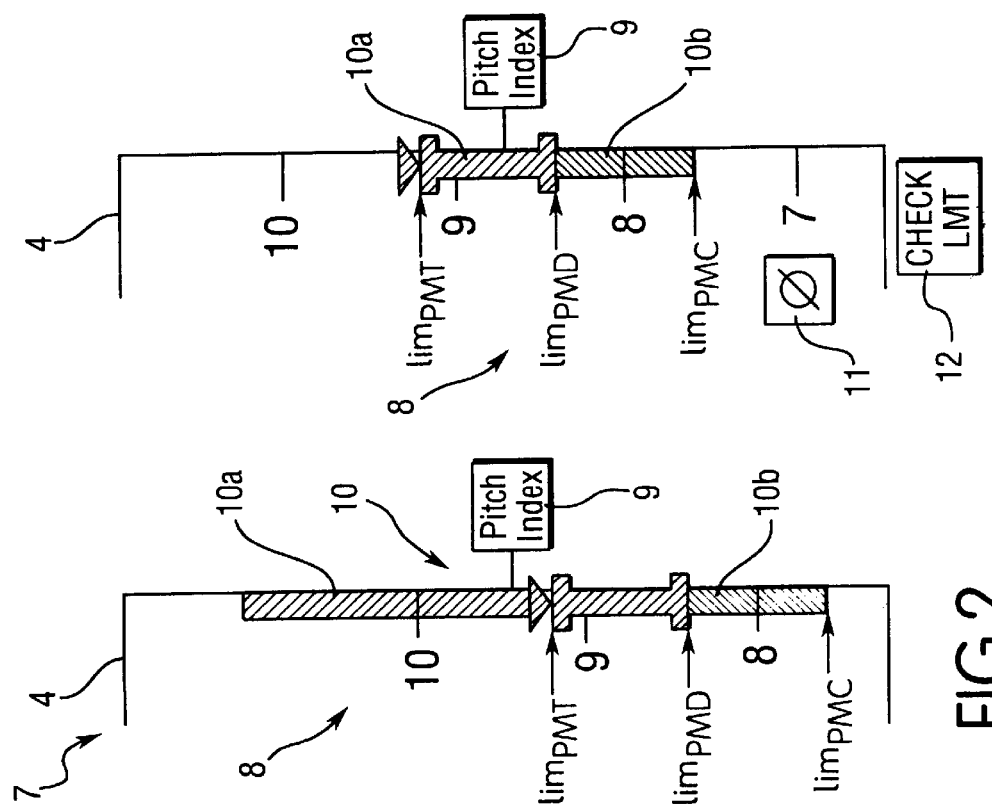

POWER MARGIN INDICATOR FOR A ROTARY-WING AIRCRAFT, ESPECIALLY A HELICOPTER

BACKGROUND OF THE INVENTION

1. Field of the Invention

The present invention relates to a power margin indicator for a rotary-wing aircraft, especially a helicopter.

2. Background Art

A helicopter is flown monitoring a great many instruments on the control panel, which instruments for the most part represent the operation of the engine and associated components and the aircraft. For physical reasons, there are many limitations that the pilot has to take into account at every moment during the flight. These various limitations generally depend on the type of flight and on the external conditions.

Most helicopters built these days are equipped with one or two turbine engines, generally with a free turbine. The power is therefore drawn off from a low-pressure stage of the turbine, which stage is mechanically independent of the compressor assembly and of the high-pressure stage of the turbine. As a turbine engine runs at between 30,000 and 50,000 revolutions per minute, a special reduction gearbox—the main gearbox (BTP)—is needed for connecting it to the rotor(s).

The thermal limitations on the engine and on the main gearbox allow three main regimes at which the engine is used to be defined:

- the take-off regime that can be used for five to ten minutes and which corresponds to a level of torque on the gearbox and to heating up of the engine turbine which are permissible for a short period of time without causing appreciable damage; this is then known as the maximum take-off power (PMD),
- the maximum continuous regime during which, at no time, are either the gearbox capabilities or the capabilities resulting from the maximum admissible heating past the high-pressure blading of the first turbine stage exceeded: this is the maximum continuous power (PMC),
- the maximum transient regime, limited to one or two tenths of a second, sometimes protected by a governor stop: this is then known as the maximum transient power (PMT).

There are also emergency excess-power regimes in multi-engined aircraft, which are used if there is a breakdown of one engine:

- the emergency regime during which the capabilities of the gearbox on the input stages and the thermal capabilities of the engine are used to their maximum: this is known as super-emergency power (PSU or OEI30") which can be used for thirty consecutive seconds, at most, and three times during a flight. If OEI30" is used, then the engine has to be taken out and overhauled;
- the emergency regime during which the capabilities of the gearbox on the input stages and the capabilities of the engine are extensively used: this is then known as maximum emergency power (PMU or OEI2') which can be used for two minutes after OEI30" or for two minutes and thirty seconds consecutively, at most;
- the emergency regime during which the capabilities of the gearbox on the input stages and the thermal capabilities of the engine are used without causing damage: this is known as intermediate emergency power (PIU or OEIcont) which can be used for from thirty minutes to two hours (depending on the engine) continuously for the remainder of the flight following the engine breakdown.

The engine test engineer through calculation or testing, establishes the curves of available power of a turbine engine as a function of the altitude and of the temperature, and does this for each of the six regimes defined hereinabove.

The limitations mentioned are generally monitored using three parameters: the speed of the gas generator (Ng), the engine torque (Cm) and the exhaust temperature of gases at the inlet to the free turbine (T4).

BROAD DESCRIPTION OF THE ENGINE

The purpose of the present invention is to provide a power margin indicator for a rotary-wing aircraft, especially a helicopter, that allows the pilot(s) to have a combined indication of the power margins, replacing a number of conventional indicators that are generally scattered across the control panel.

For this, the power margin indicator for a rotary-wing aircraft, especially a helicopter, intended to give information on the power margin available on at least one engine and one gearbox of the aircraft, as a function of the flight conditions, is noteworthy, according to the invention, in that it comprises:

- input means for the various control parameters of the engine and of the gearbox,
- calculation means connected to said input means which, on the basis of the values of the control parameters and the values of the limits for the various regimes in which the engine is used, formulate the power margin, expressed as a collective-pitch value, and
- display means showing, on a display screen, said power margins represented on a scale which is graduated in collective-pitch equivalents, capable of moving past a collective-pitch index in a window of said display screen.

As a preference, the power margin is calculated in said calculation means with respect to the first of the limits that would be reached by one of the limiting parameters of the engine or of the gearbox should the power requirement vary, this being for each of the regimes in which the engine is used.

Advantageously, said power margin scale, which is arranged vertically, is graduated from 0 to 10 degrees of pitch.

In addition, said power margin scale may be bordered by colored bands that indicate the various limits on use depending on the type of flight.

Thus the power margin indicator according to the invention may show, at every minute and in a combined way, the following information:

- the value of the pitch,
- the pitch indications of the first limit for each of the regimes in which the engine is used.

Furthermore, it may be envisaged that the display differs depending on whether the flight conditions are normal or not and/or that the pitch limits displayed are filtered by anticipating the behavior of the engine and altering the calculation laws as a function of the phase of flight. Likewise, the introduction of tests for consistency between the control and calculated parameters used, and/or the displaying of alarms if the indicator's operation should become degraded or if the displayed limits are exceeded in terms of level and/or of duration, may be envisaged.

BRIEF DESCRIPTION OF THE DRAWINGS

The figures of the appended drawing will make it easy to understand how the invention can be achieved. In these figures, identical references denote similar elements.

FIGS. 2 and 3 on the one hand, and 4 and 5 on the other hand, show the power margin scale for various types of flight, normal operation and running on one engine respectively.

DETAILED DESCRIPTION OF THE INVENTION AND DRAWINGS

Figure 1:
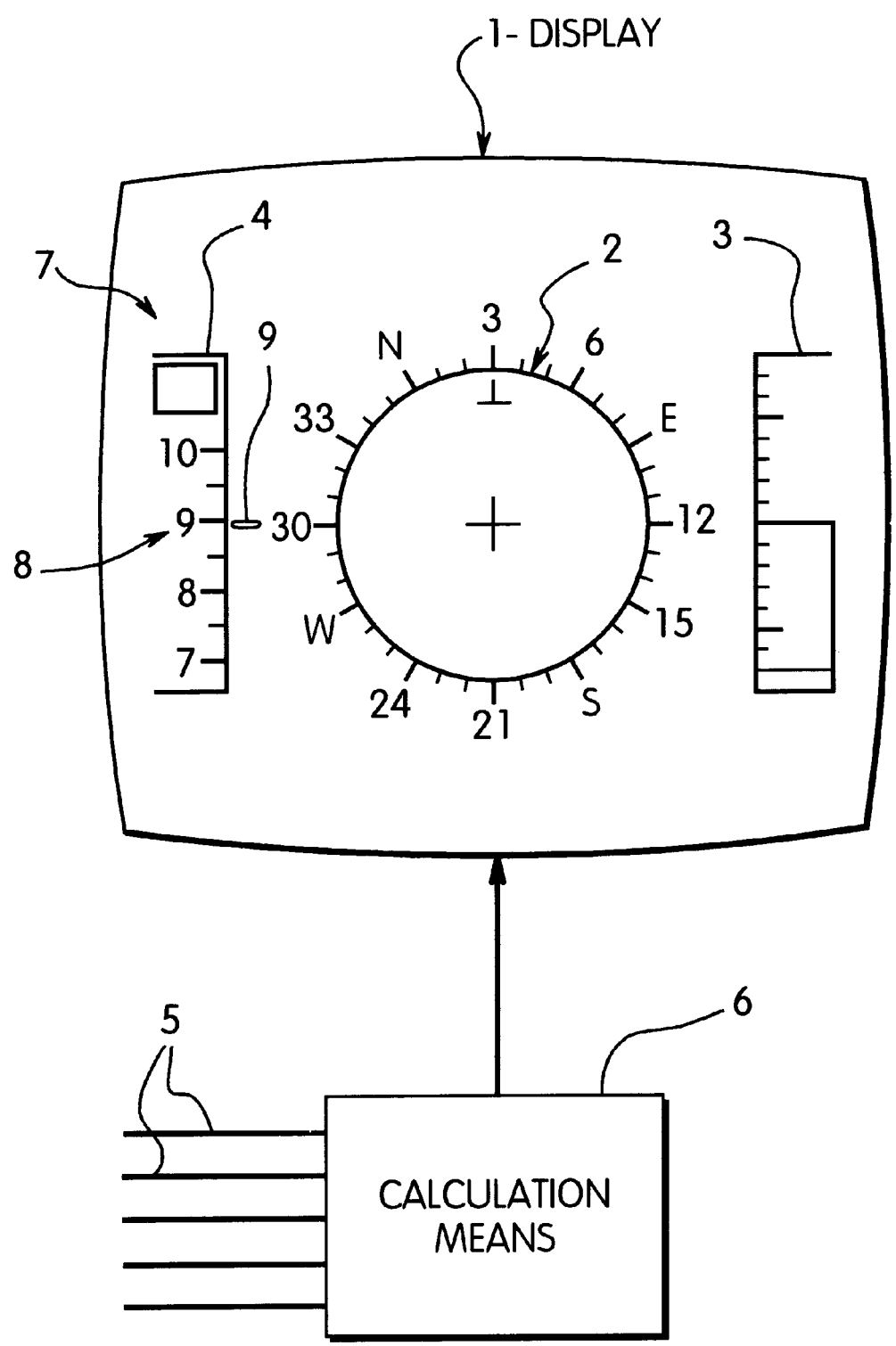
FIG. 1 diagrammatically illustrates an indicator according to the invention.

FIG. 1 shows diagrammatically a navigation and mission display 1 which has:

a headings rose 2, an altimeter 3, and a window 4 for displaying the power margins.

More specifically, the power margin indicator according to the invention comprises:

inputs 5 for the various control parameters of the engine and of the gearbox, especially Ng, Cm and T4, as defined hereinabove, these inputs being connected to corresponding sensors, including sensors for pressure P0, temperature T0, speed, collective pitch, rotor speed, engine air tappings, in particular, which are needed for the calculations, calculation means 6 connected to said inputs 5 which, on the basis of the limit values of the control parameters and the limit values for the various regimes in which the engine is used, formulate the power margin, expressed as a collective-pitch value, and display means showing, on a display screen 7, the power margins in the form of a vertical scale 8 which is graduated in collective-pitch equivalents (for example from 0 to 10), capable of moving past the pitch index 9 in the window 4 of the display screen 7.

In particular, for each of the regimes in which the engine is used, the power margin is calculated with respect to the first of the limits of the engine or of the main gearbox which would be reached should the power requirement demanded by the aircraft pilot vary.

Figure 6:
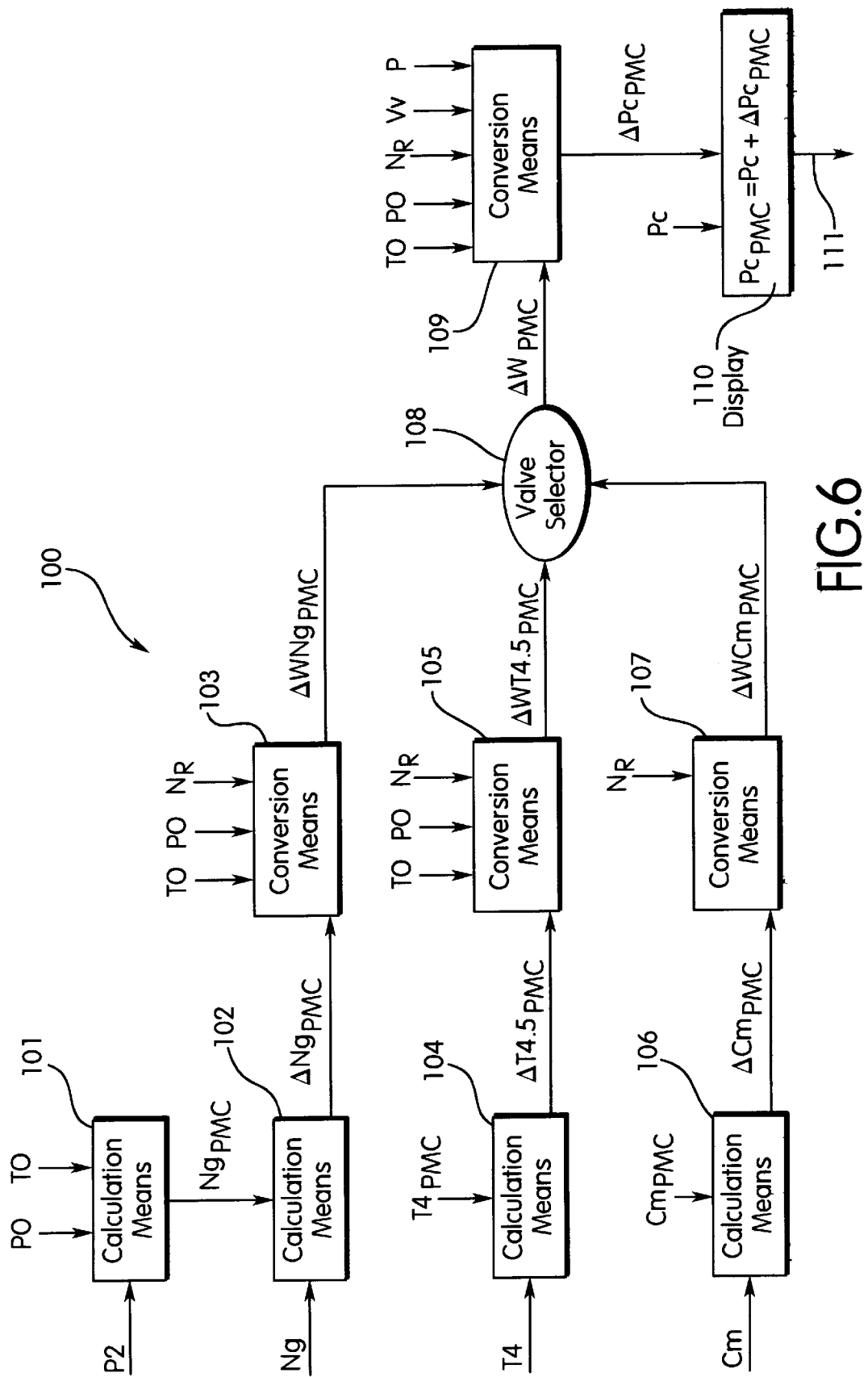
FIG. 6 illustrates the principle of calculating the first limit expressed in terms of pitch relative, by way of example, to PMC.

The principle on which the first limit, which is expressed in terms of collective pitch, is calculated, is illustrated by FIG. 6. The example of FIG. 6 shows the calculation of the limiting pitch for PMC (100). A calculation of this kind needs to be repeated for each of the regimes of the engine.

On the basis of the inputs P0, T0 and the P2 tapping, the calculation of $Ng_{PMC}$ is carried out at 101, then the Ng margin ($\Delta Ng_{PMC}$) is calculated at 102. The Ng margin is converted into a power margin $\Delta WNg_{PMC}$ at 103 ($N_R$ indicating the rotor speed).

Similarly, the calculation of the T4.5 margin is carried out at 104, this being $\Delta T4.5_{PMC}$, which is then converted into a power margin $\Delta WT^{4.5}PMC$ at 105.

In the same way, the calculation of the torque margin $\Delta Cm_{PMC}$ is carried out at 106, and is then converted into a power margin $\Delta WCm_{PMC}$ at 107.

The lowest margin $\Delta W_{PMC}$ is selected at 108, then the power margin is converted into a collective-pitch margin $\Delta Pc_{PMC}$ at 109. At 110, on the basis of the pitch and of the pitch margin, i.e. $Pc_{PMC}=PC+\Delta Pc_{PMC}$, the pitch PMC to be displayed is obtained, at 111.

The power information is displayed on the power margin indicator (on the left-hand side of the mission and navigation display 1 in the example depicted). It informs the pilot of the relationship between instantaneous power consumption, defined by the value of the collective pitch, and the first power limiting parameter encountered (Ng, Cm, $T_4$), (expressed as collective-pitch equivalent), and does so for each of the regimes PMC, PMD, PMT, OEIcont, OEI2' and OEI30".

The collective-pitch scale 8 (displayed permanently) graduated from 0 to 10 travels past the pitch index 9 to deliver its proportional collective-pitch information (in the knowledge that the 0 value on the scale does not correspond to a zero blade pitch but to the absolutely lowest pitch value, and that the value 10 corresponds to the absolutely highest pitch value).

In FIGS. 2 and 3 it can be seen that the power margin scale 8, traveling in the window 4 the size of which is approximately 3 degrees about the pitch value (index 9), is bordered by a band of color 10, divided into a yellow (or amber) band 10b and a red band 10a, that indicate the various limits depending on the type of flight.

The transient limit ["maximum transient power" (PMT)], denoted $\lim_{PMT}$ in the figures, is depicted by a red line above and toward which a red triangle points. The red band stops at the transient limit when the pitch is below this limit (FIG. 3); if it is higher than this limit, the red band is extended upward (FIG. 2).

Incidentally, the other limits used are:

$\lim_{PMC}$ (PMC for "maximum continuous power") at the bottom end of the yellow band lob, and $\lim_{PMD}$ (PMD for "maximum take-off power") at the limit of the yellow band 10b and the red band 10a (in the example of FIG. 3, the collective pitch is slightly above the $\lim_{PMD}$).

In addition, when the heating is switched on with engine air being tapped off, it is possible to use derated Ng limits, and the diagrammatic depiction 11 of a valve is displayed (FIG. 3). The pilot is thus informed that he does not have all the engine power available, and of the reason for this drop in available power (P2 or P3 air tapping off the engine). Likewise, the display at 12 of the message "CHECK LMT" indicates the loss of certain calculation parameters or a problem of consistency between these parameters.

On take-off, the pilot applies collective pitch and the pitch scale 8 travels past the index 9, at the same time as the various limit marks run downward. The pilot can apply collective pitch until the "maximum takeoff power" (PMD) pitch is achieved. For a short time (20 seconds) he can go as far as the "maximum transient power" (PMT) pitch.

For an engine that has protection built into its governing, to prevent the PMT limit from being exceeded (outside of an engine breakdown) and if, inadvertently, the pilot exceeds this limit, the engine will not go any further and the rotor speed will drop.

As soon as the take-off phase is finished, the pilot has to reduce the collective pitch so that the index does not exceed the "maximum continuous power" (PMC) pitch.

Running on one engine—in the case, of course, of a twin-engine aircraft—is moreover illustrated in FIGS. 4 and 5. This can immediately be identified by an indication OEI/. (OEI for "one-engine-inoperate", i.e. "breakdown on one engine") at 13 in FIGS. 4 and 5.

The "H" beside the OEI indication referenced 13 indicates that the OEI30" (PSU) regime has been selected and is therefore available.

When the OEI2' (PMU) regime is selected, the OEI/L indication is displayed.

The limits used are:

$\lim_{OEIcont}$ forming the bottom limit of the yellow band 10b, $\lim_{OEI}2'$ at the limit between the yellow band 10b and the red band 10a, and $\lim_{OEI}30"$ at the red triangle.

In addition, counters which keep a total of the time for which the regimes OEI30" and OEI2' have been used have been added in order to assist the pilot in controlling the amount of time for which these emergency regimes are used.

More specifically, the example of FIG. 4 illustrates what happens if OEI30" is used for longer than 30". The indication OEI/H flashes, the pilot has to reduce the pitch and switch to OEI2' (button on the collective). A total of 35 seconds of OEI30" have been used since the start of use of OEI30". In the scenario of FIG. 5, the pilot is now in cruising flight on unlimited OEI, heating open (11), the armed emergency power being OEI2' with steady display of OEI/L.

The power margin (or pitch margin) indicator according to the invention thus shows, at every moment, on a vertical scale graduated in pitch equivalents from 0 to 10 degrees, the following information:

the value of the pitch, the pitch indications of the first limit for each of the flight regimes (PMT, PMD, PMC in normal flight, on the one hand, OEI30", OEI2' OEIcont in the case of an engine breakdown on a twin-engined aircraft, on the other hand).

The difference between the pitch and a first limit gives a representation of the power margin available to the pilot in the current flight scenario, the first limit indication being the first limit (for example among the three propulsion parameters: Ng, Cm, T4) that would be encountered if the pilot were to increase the pitch:

limit of the gas generator regime (Ng) of the engine at the highest Ng, in hot weather or at altitude, torque limit BTP in cold weather and at low altitude, free turbine outlet temperature T4 limit (for a "hot" engine with P2 tappings, or at the end of the range) in hot weather or at altitude.

What is more, the indicator automatically incorporates the control laws associated with the use of the heating (P2).

Should the limit be exceeded, the action of reducing the pitch reduces each of the aforementioned three parameters and makes it possible to regain a correct situation.

The object of the invention is to display realistic power margins at steady state regime and in slow transient regimes throughout the range, from low pitch to maximum pitch. When a limit is reached, the accuracy of the display is equivalent to that of conventional indicators.

However, in fast transient regimes, it is accepted that the indicator may, temporarily, give margin values which are in error as follows:

overestimated when pitch is being increased quickly (in less than 3 s) because the pitch value increases abruptly and as the engines have not had time to accelerate, the calculated power margins initially remain constant, underestimated when pitch is being reduced quickly, also because of the engine response times.

This drawback in fast transient regimes is accepted by the pilots, given that abrupt maneuvers are pretty uncommon, fine control of the limits being achieved in almost steady state regime after the end of the transient period and filtering being introduced into the power margin indicator.

The situation is incidentally the same for conventional instruments when the pitch is increased rapidly, as the parameters Ng, T4 and Cm do not reach their limits until a few seconds after the pitch has been changed.

However, in the case of the power margin indicator, the computer 6 makes it possible to introduce filters in order to stabilize the power margin values displayed by:

anticipating engine variations, filtering the displays, modifying the calculation laws as a function of the maneuvers and power levels.

It will be noted that the calculations associated with the instrument require a great many constants in memory:

values of the limiting parameters (T4, Cm), calculation polynomial coefficients, constants (thresholds, especially differences).

While the limits regarding Cm and T4 are generally constants, the limits on Ng are provided by the computer as a function of the flight conditions.

Algorithms for the various flight conditions use three equivalence laws:

an equivalence law linking the temperature margin T4 with the margin Ng, determined by calculation, this law coming from the mathematical model of the engine, an equivalence law linking the regime margin Ng with an engine power margin, determined by calculation, this law also coming from the mathematical model of the engine, and to express the margin in terms of pitch value, calculations that give a curve of variation of the power needed for flight with collective pitch for the entire flight range, this law coming from the results of flights and simulations.

As the information supplied by the indicator combines a great deal of detail, and the conventional indicators are used then only as a back-up, it is necessary for the system to carry out automatic tests on the various parameters in order to warn the pilot of any anomaly, such as an abnormally low value of one parameter, which could otherwise remain undetected throughout the flight.

Should a breakdown in one parameter, for example, be detected, the power margin indication is erased from the screen and the message "CHECK LMT" is displayed, because the calculations are rendered utterly false because of the breakdown in the parameter (when running either on one engine or on two engines).

Automatic tests in twin-engine running replace the theoretic monitoring, by the pilot, for consistency, with a conventional piece of instrumentation and detect, like a pilot would, any appreciable imbalance between the two engines in terms of Ng, T4 and Cm. What is more, the consistency between the limits of Ng calculated by the two computers associated with the engines and the consistency between the Ng supplied by the speed sensors and those supplied by said computers is checked.

The system then displays "CHECK LMT" under the twin-engine indicator scale, letting the pilot know that there is an anomaly that needs to be checked on the conventional indicators, and that it may be necessary for the state of health of the engines to be checked.

In addition, two thermal consistency checks on each engine are envisaged:

when the T4 limit is reached before the Ng limit, when T4 leaves the range of normal variation about the value $T4_{max}$ as a function of instantaneous Ng.

Incidentally, the system needs to determine what kind of flying has been done, and take this into account in the limits, the calculations, and the display:

normal, twin-engine running, running with one engine (there being a breakdown on one engine), training (the speed of the other engine being reduced for engine-breakdown training), whether the heating is on or off.

The "single-engine running" scenario is detected by the presence of arming of OEI30" or OEI2', but also by a substantial difference between the Ng or the torques of the two engines (OEI for "One-Engine-Inoperate", that is to say "breakdown in one engine").

The power margin indication is also erased (in addition to when there is an obvious problem with one parameter) in cases where it is impossible to provide a display or where use is impossible, i.e.:

no engines started, computer breakdown with at least one engine.

What is claimed is:

1. A power margin indicator for a rotary-wing aircraft, giving information on power margin available on at least one engine and one gearbox of the aircraft, as a function of the flight conditions, the indicator comprising:

input means (5) for various control parameters of the engine and of the gearbox, calculation means (6) connected to said input means (5) which, on the basis of values of the control parameters and the values of limits for various regimes in which the engine is used, express a collective-pitch value, and display means (4, 8, 9) comprising a power margin scale (8) which is graduated in collective-pitch equivalents and is capable of moving past a collective-pitch index (9) in a window (4) of a display screen (7), said display means further showing on said display screen (7);

the value of the collective-pitch, and pitch indications of a first limit for each of the flight regimes, wherein the difference on the power margin scale (8) between the collective-pitch value and the first limit gives a representation of the power margin available to a pilot of the rotary-wing aircraft.

2. The indicator as claimed in claim 1, wherein said power margin scale (8), which is arranged vertically, is graduated from 0 to 10 degrees of pitch.

3. The indicator as claimed in claim 2, wherein said power margin scale (8) is bordered by colored bands (10) that indicate various limits on use depending on type of flight of the rotary-wing aircraft.

4. The indicator as claimed in claim 1, wherein the display screen (7) differs depending on whether the flight conditions are normal or not normal.

5. The indicator as claimed in claim 1, further comprising means for testing the consistency between the control parameters and calculated parameters.

6. The indicator as claimed in claim 1, wherein alarms are displayed when operation of the indicator should become degraded or when the displayed first limit is exceeded in terms of level or duration.

* * * * *